Aug. 30, 1932.                    T. A. SWEENEY                    1,875,277
          DEVICE FOR BAKING AN EDIBLE PRODUCT COMPRISING A MEAT
             CENTER INCASED IN AN ENVELOPE OF RAISING DOUGH
                         Filed Feb. 11, 1929          2 Sheets-Sheet 1

INVENTOR
Terrence A. Sweeney
BY
ATTORNEY

Aug. 30, 1932.　　　T. A. SWEENEY　　　1,875,277
DEVICE FOR BAKING AN EDIBLE PRODUCT COMPRISING A MEAT
CENTER INCASED IN AN ENVELOPE OF RAISING DOUGH
Filed Feb. 11, 1929　　　2 Sheets-Sheet 2

INVENTOR
Terrence A. Sweeney
BY
ATTORNEY

Patented Aug. 30, 1932

1,875,277

UNITED STATES PATENT OFFICE

TERRENCE A. SWEENEY, OF MERCER ISLAND, WASHINGTON, ASSIGNOR TO THOR MANUFACTURING COMPANY, INC., A CORPORATION OF NEW YORK

DEVICE FOR BAKING AN EDIBLE PRODUCT COMPRISING A MEAT CENTER INCASED IN AN ENVELOPE OF RAISING DOUGH

Application filed February 11, 1929. Serial No. 339,050.

My invention relates to a device for baking an edible product comprising a meat center incased in an envelope of raising dough.

For purposes of definiteness and clearness of description, I will set forth my invention as applied to cooking a weiner incased in waffle dough, the dough being baked simultaneously with its being formed about the weiner, but it is to be understood that my invention is not to be limited to any such specific application of the meat center in the form of a weiner or to dough of the waffle formula, but it is to be understood as including all embodiments overcoming like difficulties and having the same mode of operation.

In providing such an edible product, a serious problem crises in preventing sogginess in the dough next to the meat center. The meat must be cooked entirely through its center and hence this period of introducing heat to the meat must be synchronized with the baking period of the dough. Obviously, as the dough is being baked it gives up great quantities of moisture and likewise, the meat upon being heated gives up great quantities of moisture. Since the meat is located in the center of the product and the enveloping dough relatively rapidly forms under the baking temperature, the moisture content of the meat becomes entrapped and produces a soggy condition of the dough next to the center. Such a product meets with serious objection.

While preventing sogginess of the dough and at the same time heating or cooking the meat entirely through, the means by which the heat is applied to the meat must be such as not to sear the meat to the said means, for then the baked product cannot be readily released from the baking device.

In providing such a product, the primary object of my invention is to overcome all such objections, as well as to provide a method and device for baking such a product.

The above mentioned general objects of my invention, together with others inherent in the same, are attained by the device, illustrated in the following drawings, the same being a preferred exemplary form of embodiment of my invention, throughout which drawings like reference numerals indicate like parts:

Figure 1:
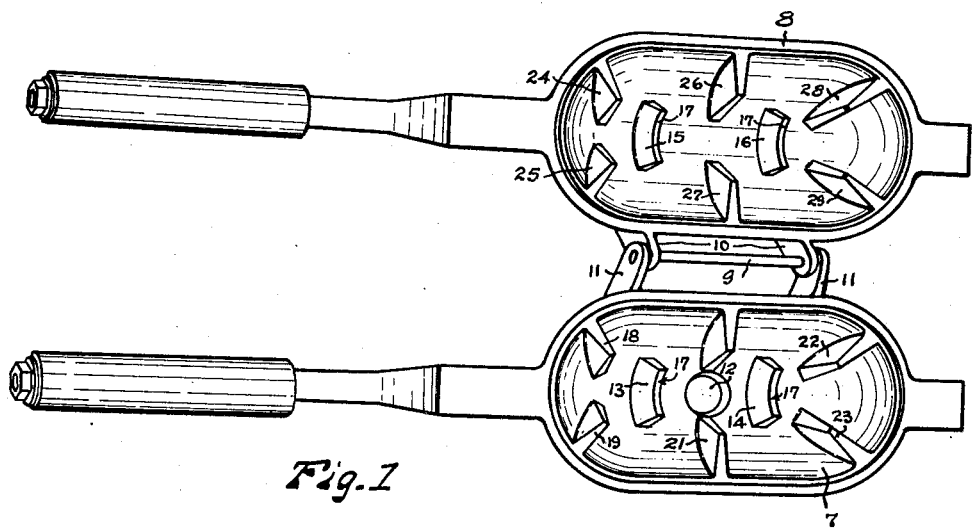
Figure 1 is a view in perspective of the device, in open position, embodying my invention.
Figure 2:
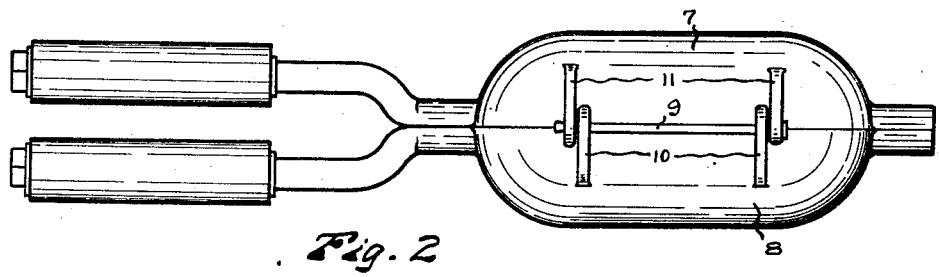
Fig. 2 is a rear view in elevation of a device embodying my invention.
Figure 3:
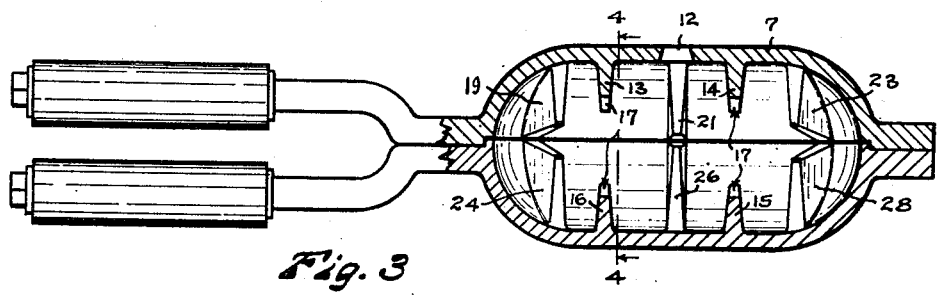
Fig. 3 is a view in longitudinal section through the vent opening in the top of the device.
Figure 4:
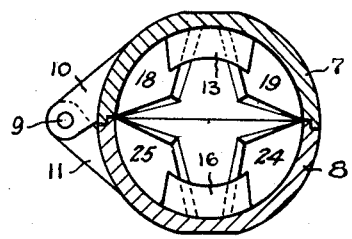
Fig. 4 is a view in cross section on line 4, 4 of Fig. 3.
Figure 5:
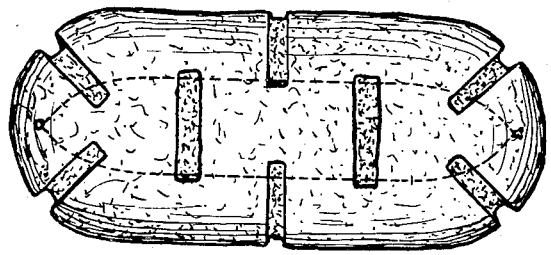
Fig. 5 is a view in perspective of the product embodying my invenion.
Figure 6:
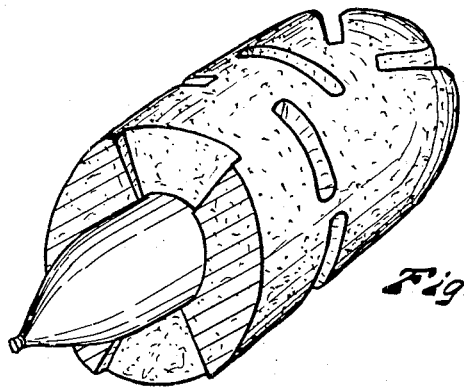
Fig. 6 is a fragmentary view in section of the said product.

The device for baking the product herein described, which may be called a "weiner waffle iron", comprises two baking molds, a top 7, and a bottom 8, hingedly connected by pin 9 engaging lugs 10 and 11 so that the two molds may be folded one upon the other as readily appears from the drawings. In the top mold 7, a vent hole 12 is provided. A meat center or weiner cooking and contacting means or lugs 13 and 14 are provided for mold 7 and lugs 15 and 16 are provided for mold 8. These cooking and contacting means are oppositely positioned and are spaced to receive the largest weiner intended to be employed—it being understood that weiners are of different diameters so that in the case of the smaller weiners, only the cooking and contacting means 15 and 16 of the lower mold contacts the weiner. The contact area 17 of the width of these cooking and contacting means is of such magnitude as to prevent the dough when baking from cutting off contact between the said means and the weiner. The importance of such contact is to permit the escape of the moisture from the meat center. "Contact" of course would here include situations where the layer of dough between the weiner and the contact area or lug face 17 is of such thinness as to permit of the escape of the moisture. By making these lugs or cooking and contacting means one-eighth (⅛) of an inch in width, they maintain, I find, positive contact with the meat center. Also this width prevents the said means penetrating the meat and searing the same. If the latter occurs, then the product will be broken in attempting to remove it from the molds when through baking. Other heating lugs, 18, 19, 20, 21 and 22, 23, 24, 25, 26, 27, 28 and 29 are provided for introducing heat into the dough. These lugs preferably do not contact the meat center, since it is desirable to form a complete envelope or incasement for the meat center or one as nearly complete as possible.

By having the cooking and contacting lugs 13, 14, 15 and 16 of such length and such width to provide contact area sufficient to maintain contact between the lug face 17 and the weiner during the baking period of the dough, not only is cooking heat conducted to the meat center (this without penetrating and so searing the meat to the lug) but it seems the moisture is permitted to escape between the heated metal surface of the lug and the elastic adjacent surface of the dough, and thence between the heated metal surface of the mold and the dough to the vent hole 12 or between the adjacent edges of the molds 7 and 8. In any event, the result is that by following my invention, a weiner may be encased in an envelope of waffle dough without sogginess of the dough next the meat, only the relatively small section of the weiner engaging the lug face 17 being uncovered and often this is for the most part covered with a very thin baked dough envelope. Slices of bacon may be employed as the meat center.

Obviously, changes may be made in the form, dimensions, and arrangement of the parts of my invention, without departing from the principle thereof, the above setting forth only a preferred form of embodiment.

I claim:

1. A device for cooking an edible product formed of a meat center incased in a baked envelope of raising dough, said device comprising two baking mold members hinged along one side, whereby one of said members may be folded upon the other, either of said members being adapted to receive dough and each of said members being provided with cooking and contacting means whereby a meat center as a unit may be centrally supported while the dough is caused by baking to rise and fill said device to incase the meat center; a vent hole in one of said molds; and heating lugs adapted to penetrate the dough envelope for facilitating the baking thereof.

2. A device for cooking an edible product formed of a meat center incased in a baked envelope of raising dough, said device comprising two baking mold members hinged along one side, whereby one of said members may be folded upon the other, either of said members being adapted to receive dough and each of said members being provided with cooking and contacting means whereby a meat center as a unit may be centrally supported while the dough is caused by baking to rise and fill said device to incase the meat center, such cooking and contacting means being characterized by having an area of such proportions as to maintain direct contact with the meat during the baking operation by excluding the dough, whereby moisture from the meat may escape during baking; a vent hole in one of said molds; and heating lugs adapted to penetrate the dough envelope for facilitating the baking thereof.

3. A baking mould device comprising a pair of opposing companion sections and means whereby said sections may be held together along a first axial plane of the device, the inner walls of said sections being depressed and covering each other to form a cavity between them, each wall having a plurality of lugs projecting therefrom into said cavity, a series of said lugs being arranged around the rim of each wall and along said plane and another, a non-rim series, arranged across another axial plane, a group of said rim lugs being located on one side of said last plane and a group on the other, said groups being spaced apart,—said other series of lugs overlapping the first series and being located across said space, the base of each rim lug extending the major portion of the distance between said axial planes, the base of each of non-rim lug being over half that of a rim lug, whereby a meat body may be held centralized in said cavity between said non-rim lugs and batter may be effectively baked between the meat body and the sides of the device in the spaces between the lugs.

4. A making mould device comprising a pair of opposing companion sections and means whereby said sections may be held together along a first axial plane of the device, the inner walls of said sections being depressed and covering each other to form a cavity between them, each wall having a plurality of lugs, projecting therefrom into said cavity, a series of said lugs being arranged around the rim of each wall along said plane, some of the said rim lugs being located in one group on one side of another axial plane at right angles to said first one and the others in another group on the opposite side of said other plane, said groups being separated from each other to form a space between two other non axial planes parallel to said last axial plane, the base of each of said margin lugs covering the major portion of the distance between axial planes along the wall, and central lugs projecting from each wall parallel to each other into said cavity and transverse said non axial planes, the top of each of the central lugs being not less than a quarter the length of the base of one of said marginal lugs, whereby a meat body may be held centralized in the device between the central lugs of the two sections at a substantial distance from said sides and whereby batter may be effectively baked between the meat body and the sides of the device in the space between the lugs.

In witness whereof, I hereunto subscribe my name this 1st day of February, 1929.

TERRENCE A. SWEENEY.